(12) United States Patent
Payer

(10) Patent No.: US 6,813,857 B2
(45) Date of Patent: Nov. 9, 2004

(54) SNAG-RESISTANT FISHING LURE ASSEMBLY

(76) Inventor: Frank S. Payer, 124 Fort Hunter Rd., Apt. 3, Harrisburg, PA (US) 17110

( * ) Notice: Subject to any disclaimer, the term of this patent is extended or adjusted under 35 U.S.C. 154(b) by 0 days.

(21) Appl. No.: 10/192,103

(22) Filed: Jul. 10, 2002

(65) Prior Publication Data

US 2004/0006907 A1 Jan. 15, 2004

(51) Int. Cl.$^7$ .............................................. A01K 85/02
(52) U.S. Cl. ........................ 43/42.4; 43/42.36; 43/42.39; 43/42.49
(58) Field of Search ................................. 43/42.4, 42.1, 43/42.05, 42.08, 42.23, 42.36, 42.39, 42.49, 42.42

(56) References Cited

U.S. PATENT DOCUMENTS

| | | | | |
|---|---|---|---|---|
| 1,250,189 A | * | 12/1917 | Kinsey | 43/42.39 |
| 1,419,540 A | * | 6/1922 | Brown | 43/42.42 |
| 1,627,512 A | * | 5/1927 | Hughes et al. | 43/42.49 |
| 1,840,273 A | * | 1/1932 | Lang | 43/42.42 |
| 2,079,883 A | * | 5/1937 | Valasek | 43/42.42 |
| 2,335,322 A | * | 11/1943 | Taylor | 43/42.49 |
| 2,374,279 A | * | 4/1945 | Fugler | 43/42.39 |
| 2,503,369 A | * | 4/1950 | Wycech | 43/42.42 |
| 2,561,515 A | * | 7/1951 | Keeler | 43/42.39 |
| 2,595,191 A | * | 4/1952 | Erickson | 43/42.36 |
| 2,601,160 A | * | 6/1952 | Mattieson | 43/42.4 |
| 2,641,081 A | * | 6/1953 | Moore | 43/42.42 |
| 2,682,128 A | * | 6/1954 | Weigandt | 43/42.36 |
| 2,819,553 A | * | 1/1958 | Fultz | 43/42.49 |
| 2,994,151 A | * | 8/1961 | Webb | 43/42.4 |
| 3,131,504 A | * | 5/1964 | Haulk | 43/42.4 |
| 3,253,363 A | * | 5/1966 | Steehn | 43/42.4 |
| 3,279,117 A | * | 10/1966 | Weimer | 43/42.23 |
| 3,363,359 A | * | 1/1968 | Oney | 43/42.49 |
| 3,535,814 A | * | 10/1970 | O'Brien | 43/42.49 |
| 4,044,491 A | * | 8/1977 | Potter | 43/42.36 |
| 4,129,957 A | * | 12/1978 | Thirlby | 43/44.2 |
| 4,535,562 A | * | 8/1985 | Fry | 43/42.49 |
| 4,569,147 A | * | 2/1986 | Margulis | 43/42.22 |
| 4,742,639 A | * | 5/1988 | Gunn | 43/42.39 |
| 4,819,365 A | * | 4/1989 | Landuydt | 43/42.42 |
| 4,862,629 A | * | 9/1989 | Ryan | 43/42.39 |
| 5,119,581 A | * | 6/1992 | Rudolph | 43/42.39 |
| 5,142,811 A | * | 9/1992 | Freeman | 43/42.36 |
| 5,617,667 A | * | 4/1997 | Gonzalez | 43/42.36 |
| 5,822,914 A | * | 10/1998 | Tadych | 43/42.42 |
| 5,983,554 A | * | 11/1999 | Storey | 43/42.42 |

FOREIGN PATENT DOCUMENTS

| | | | | |
|---|---|---|---|---|
| CA | 711437 B1 | * | 6/1965 | 43/42.42 |
| RU | 1616566 B1 | * | 12/1990 | 43/42.08 |

OTHER PUBLICATIONS

Rich Zaleski, "The Changing Nature of Jigs and Jigging–Jack About Jigs for Bass", In–Fisherman Magazine (a Primedia Publication), Feb. 2002, pp. 39–43.

Matt Straw, "The Changing Nature of Jigs–Smallmouth Style", In–Fisherman Magazine (a Primedia Publication), Feb. 2002, pp. 47–51, 54.

Paul A. Canada, "The Right Jig for the Job", 2002 Bass Guide (a Primedia Publication), publishing data unknown but published prior to application filing date, pp. 44–47.

* cited by examiner

Primary Examiner—Darren W. Ark
(74) Attorney, Agent, or Firm—Hooker & Habib, P.C.

(57) ABSTRACT

A snag-resistant fishing lure assembly includes a lightweight snag guard mounted to a fishing lure body. The snag guard has a guard member that precedes the lure body when the lure is pulled by a fishing line, and the snag guard can be formed from the end of the line.

17 Claims, 6 Drawing Sheets

SNAG-RESISTANT FISHING LURE ASSEMBLY

FIELD OF THE INVENTION

The invention relates generally to fishing lures, and particularly to a snag-resistant fishing lure assembly.

BACKGROUND OF THE INVENTION

Fishing is a popular recreational pastime. One favorite style of fishing involves casting a fishing lure and retrieving the lure to catch fish. The retrieve entices fish to strike the lure. Lures are available in almost an infinite variety of shapes, weights, and buoyancy.

A lure must be cast near fish to be effective. When fishing in open waters, lures can be retrieved without snagging. Many game fish, though, avoid open water and congregate or school close to underwater structure. Such structure may include tree stumps, vegetation, rocks, or other objects. Casting the lure among these objects is often the key to successfully catching fish.

Lures often snag when retrieved through structure. The lure snags against the structure and can't be retrieved until the snag is cleared. The fishing line often must be cut to continue fishing, and the lure is lost.

Many conventional fishing lures have bodies that tend to snag obstacles. FIG. 1 illustrates snagging of a conventional lure body, with a jig 1 snagged against structure 2. A jig is a fishing lure having a weighted jig head 3 and a barbed fishhook 4 extending rearwardly from the jig head. The hook is typically dressed with a plastic bait or natural bait (not shown) to attract fish. The fishhook has an eyelet 5 at the front of the jig for attaching the fishing line 6. The line is attempting to retrieve the jig in a retrieval direction R.

As shown in the figure, the jig presents an abrupt increase in cross section area transitioning from the fishing line at the eyelet to the jig head. The fishing line can slide against the object during the retrieve, but the abrupt change prevents the jig head from sliding smoothly past the object and causes it to snag against object 2.

Other conventional fishing lures have bodies that resist snagging when fished through structure. Such lures have "streamlined" bodies, that is, the body has a relatively sharp and pointed leading end that smoothly tapers outwardly from the front of the lure. These lure bodies are "inherently snagless" in that the body shape enables the body to pass by or engage structure or obstacles and resist snagging.

Fishing lures, regardless of body type, include other components that tend to snag obstacles. These include the fish hooks attached to the body and, for crank baits, lips or bills that extend from the front of the body to impart action, control depth or provide stability during retrieve.

Weed guards or hook guards that resist snagging of fishhooks are well known. These guards do not prevent snagging of lure bodies.

Other guards have been developed that resist snagging of lips or bills. Such lip guards are disclosed, for example, in Landuyt, U.S. Pat. No. 4,819,365 and Thirlby, U.S. Pat. No. 4,129,957. Both Landuyt and Thirlby disclose lip guards that attach to a lip and precede the lip during retrieve. Obstacles encountering the lip guard are diverted to one side of the lip or the other. Because the lip extends from the lure body, some obstacles are directed by the lip guard against the lure body.

Lip guards do not prevent snagging of lure bodies. In fact, because lip guards direct some obstacles against the lure body, the guards must be used with "inherently snagless" lure bodies. Otherwise, lip guards would direct obstacles to snag against lure bodies such as the body shown in FIG. 1. Furthermore, because lip guards are directly attached to the lip and pull on the lip during retrieve, they can interfere with proper functioning of the lip and impair lure performance.

Other conventional lures are fished with tapered or conical weights that slide on the fishing line ahead of the lure to form a snag-resistant fishing lure assembly. An example of such an assembly is known as the "Carolina rig" for fishing plastic worms. Snag-resistant weights cannot be used with all lures, however, and may destroy the action and desired buoyancy of the lure.

Thus

Thus there is a need for an improved snag-resistant apparatus or snag guard for use with fishing lures. The snag-guard should be usable with lure bodies that are not "inherently snagless" as well as those that are "inherently snagless". The snag guard should be lightweight to not substantially affect the buoyancy and action of the lure, should be readily adaptable for use with many types of conventional fishing lures, and should not substantially impair the performance of lures having a bill or lip.

SUMMARY OF THE INVENTION

The invention is an improved snag-resistant fishing lure assembly including a fishing lure and snag guard. The assembly is light weight and can be adapted for use with many types of conventional lures, including jigs and crankbaits.

A fishing lure assembly in accordance with the present invention includes a fishing lure having a body and a fishhook connected to the body. The body includes first and second outer surfaces separated by a width of the body; the surfaces on a transverse body cross section having a substantial cross section area.

A light-weight snag guard is mounted to the body to resist snagging of the lure by foreign objects. The snag guard includes an elongate guard member extending proximate from the first body surface to proximate the second body surface. An intermediate portion of the snag guard is spaced from and precedes the fishing lure so that when the lure is pulled by the fishing line, the snag guard contacts foreign objects ahead of and in the path of the lure. The guard member has a smooth leading surface to slide against foreign objects without snagging.

In a preferred embodiment of the invention the snag guard is formed from the free end of the fishing line and extends through a bore formed in the lure body. The snag guard can pivot or rotate in the bore to enable the lure body to pivot about the snag guard and slide past some obstructions. In yet other preferred embodiments of the invention the snag guard can be preformed and mounted on the fishing lure for later attachment to the fishing line.

The snag guard of the present invention provides a number of benefits over conventional snag guards. The snag guard can be used with lure bodies that are not "inherently snagless", as well as lure bodies that are "inherently snagless". It can be used on lures that do not have lips or bills. But it can be used on lures with bills or lips without being attached to the bills or lips, and yet will reduce the risk of the bills or lips snagging against obstacles during the retrieve.

Using the improved fishing lure assembly of the present invention with jigs while fishing for bass along the shore of the Susquehanna River reduced the number of snags to about ⅕ of what would be expected of a conventional jig tied directly to the fishing line. The greatly increased number of snag-free casts increased the number of fish caught and improved the quality of the time spent fishing.

Other objects and features of the invention will become apparent as the description proceeds, especially when taken in conjunction with the accompanying drawings illustrating fishing lure assemblies of the present invention, of which there are six sheets of six embodiments.

DESCRIPTION OF THE PREFERRED EMBODIMENTS

Figure 1:
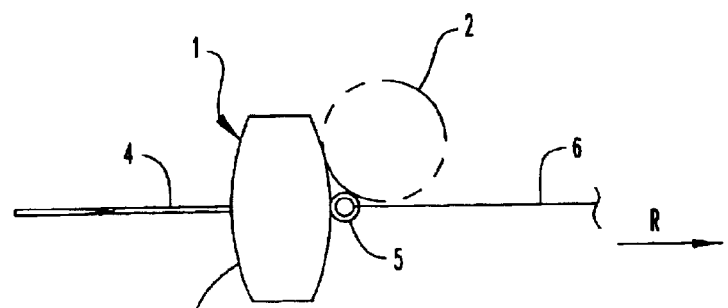
FIG. 1 is a top view of a prior art jig illustrating snagging of the jig head against an obstruction.
Figure 2:
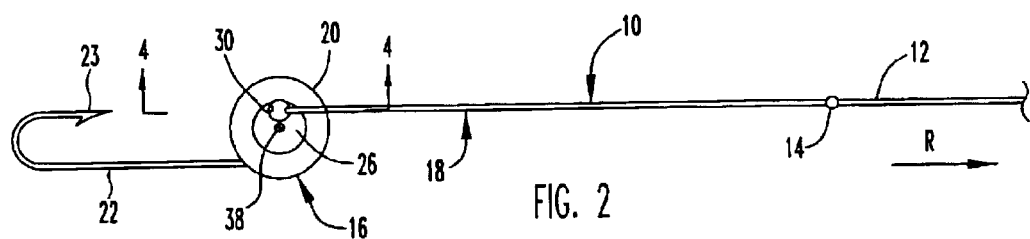
FIG. 2 is a side view of a first embodiment fishing lure assembly in accordance with the present invention.
Figure 3:
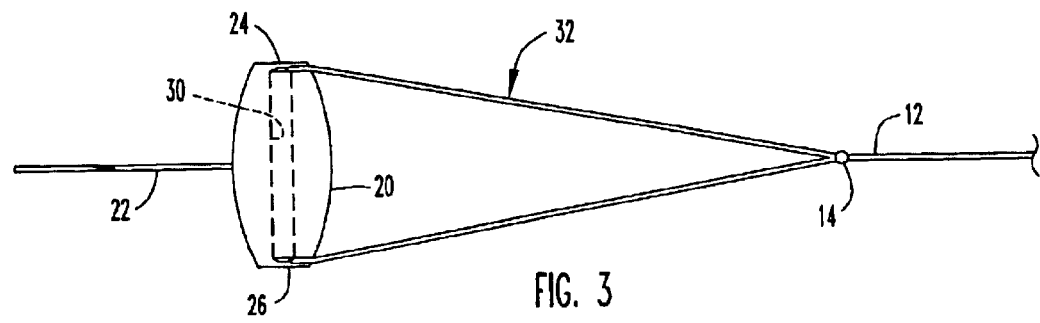
FIG. 3 is a top view of the fishing lure assembly shown in FIG. 2.
Figure 4:
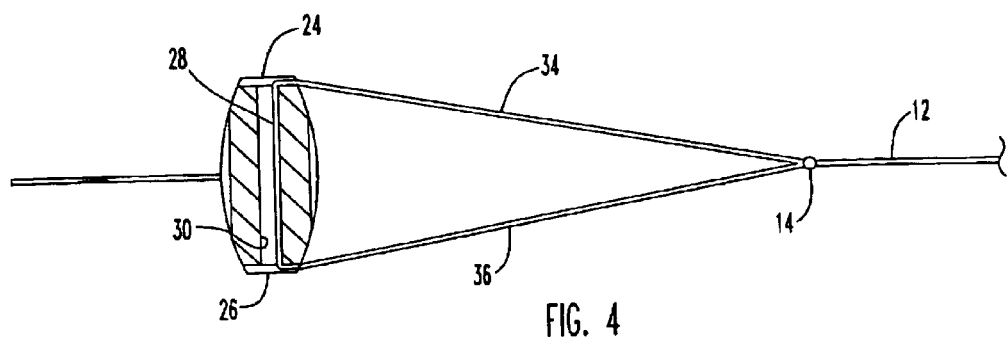
FIG. 4 is a sectional view of the fishing lure assembly shown in FIG. 3 taken generally along line 4—4 of FIG. 2.

FIGS. 2–4 illustrate a first embodiment fishing lure assembly 10 in accordance with the present invention. The assembly 10 is shown being pulled by a fishing line 12 in a retrieval direction R. A knot 14 formed in the fishing line connects the fishing line to the fishing lure assembly.

The fishing line 12 is a flexible material, specifically nylon monofilament.

The fishing lure assembly 10 includes a fishing lure 16 and a light-weight snag-resistant device or snag guard 18 attached to the lure. In the illustrated embodiment the fishing lure 16 is a jig having a lure body formed by a jig head 20. A fishing hook 22 is rigidly held by the jig head and extends rearwardly from the jig head 20 to a barbed end 23. When fished the jig 16 would include plastic bait, streamers, feathers, natural baits or other conventional jig dressing to attract fish and entice strikes. The jig dressing is conventional and not shown.

The jig head 16 is shaped like a conventional football-type jig head and includes a pair of spaced-apart outer surfaces 24, 26.

The surfaces 24, 26 are on opposite sides of a body cross section perpendicular to the retrieval direction R. The cross section has an area substantially greater than the cross section area of the fishing line.

The snag guard 18 is mounted to the jig head and extends to the knot 14 so that the snag guard 18 precedes the jig head during retrieve. The snag guard 18 includes an attachment member 28 (see FIG. 4) mounted in a through bore 30 formed in the jig head 20 to mount the snag guard 18 to the jig head. The attachment member pulls the fishing lure 16 during the retrieve.

The bore 30 opens at the first and second body surfaces 24, 26 and is spaced from the center of gravity 38. The weight of the jig head biases the orientation of the jig head with respect to the attachment member 28 so that the fishhook 22 rides in the upright position shown during the retrieve. The bore 30, being offset from the center of gravity, does not extend through the widest portion of the jig head 20. The widest part of the jig head extends slightly beyond the ends of the bore 30.

The ends of an elongate guard member 32 are attached to the ends of the attachment member 28 and extend away from the fishing lure to contact foreign objects ahead of and in the path of the lure during retrieval. The guard member 32 includes a first guard rod or filament 34 that extends proximate the surface 24 to the knot 14 and a second guard rod or filament 36 that extends proximate the surface 26 to the knot 14. Each guard rod 34, 36 presents a smooth leading surface to slide against contacted foreign objects without snagging during retrieval.

The snag guard 16 is formed from the free end of flexible fishing line 12 that retrieves the lure assembly. The bore 30 has an internal diameter larger than the fishing line diameter. The fishing line is passed through the bore 30 and knotted with the standing fishing line at knot 14 to form a loop at the end of the line 12.

Operation of the snag guard 18 will now be discussed. The fishing line 12 forms a light-weight snag guard whose weight has no substantial affect on the action of the jig 16 when fishing. The snag guard 18 also has a relatively small cross section area in comparison with the cross section area of the jig 16 so that the snag guard does not create substantial drag during the retrieve.

When the fishing line is retrieved, the drag of the lure 16 makes the loop taut and forms the guard filaments 34, 36 as shown. The snag guard 18 becomes triangle-shaped, with the guard filaments 34, 36 extending from the apex of the triangle at the knot 14 towards the attachment member 28. The fishing line forming the snag guard 18 is free to slide in the bore 30 so that the triangle legs 34, 36 are automatically equalized and the fishing line 14 pulls the fishing lure 16 along the centerline of the lure.

Figure 5:
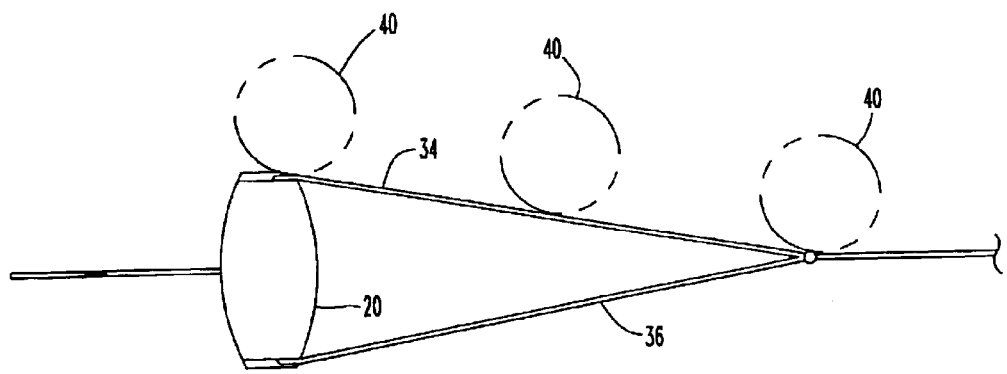
FIG. 5 is similar to FIG. 3 and illustrates snag-free operation of the fishing lure assembly against a vertical obstruction.

FIG. 5 illustrates engagement of the snag guard 18 against a vertical obstruction 40 during retrieval of the fishing lure 16. The obstruction is located in the path of the jig head 20.

The obstruction comes against the fishing line 12 and moves along the fishing line towards the jig head 20. The obstruction contacts one of the guard filaments 34, 36 (filament 34 in FIG. 5) and slides along the filament towards the jig head 20. The obstruction reaches the base of the triangle adjacent to and to one side of the jig head 20. The jig head 20 can then move past the obstruction 40 without snagging. The sides of the jig head 20 extending outwardly of the guard filaments 34, 36 extend beyond the snag guard 18 only a short distance and will not snag as the obstruction moves past.

Figure 6:
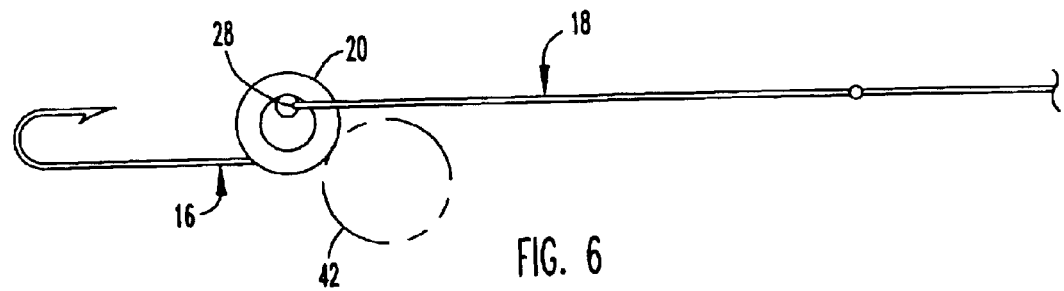
FIG. 6 is similar to FIG. 2 and illustrates engagement of the fishing lure assembly against a horizontal obstruction.
Figure 7:
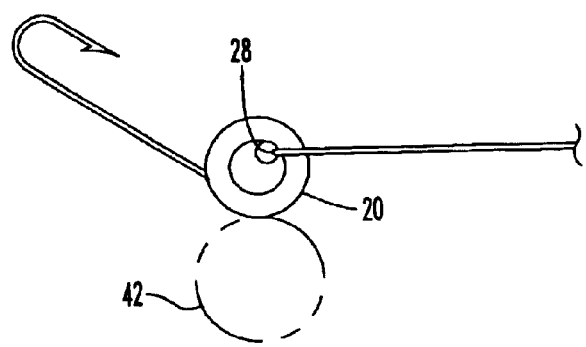
FIG. 7 is similar to FIG. 6 and illustrates snag-free operation of the fishing lure assembly against the horizontal obstruction.

FIGS. 6 and 7 illustrate engagement of the snag guard 18 against a horizontal obstruction 42 during retrieval of the fishing lure 16. As shown in FIG. 6, the obstruction contacts the lower half of the jig body 20. The jig head 20 is free to pivot or rotate about the attachment member 28 as the jig head is retrieved past the obstruction, see FIG. 7. This enables the jig head 20 to be lifted up and over the obstruction 42 without snagging. The jig 16 returns to its normal orientation after passing the obstruction.

Figure 8:
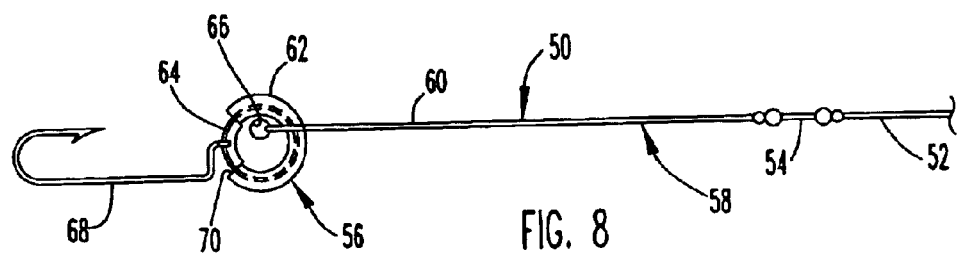
FIG. 8 is a side view of a second embodiment fishing lure invention in accordance with the present invention.

FIG. 8 illustrates a second embodiment fishing lure assembly 50 attached to a fishing line 52 by terminal tackle, such as the barrel swivel 54 shown. The fishing lure assembly includes a jig 56 attached to a snag guard 58. The snag guard 58 is similar to the snag guard 18 but is formed from a length of fishing line 60 separate from the fishing line 52. The fishing line 60 can be pre-tied to the barrel swivel 54 prior to fishing. Other types of terminal tackle are known and can be used to connect the fishing line with the fishing lure assembly.

The jig 56 has a weighted jig head 62 that carries a split ring 64. A bore 66, similar to the bore 30, extends through the jig head and split ring for mounting the snag guard 58 to the jig head. The eyelet of a fishing hook 68 is pivotally mounted on the split ring and a groove 70 at the rear of the jig head enables limited movement of the hook along the split ring for additional lure action.

Figure 9:
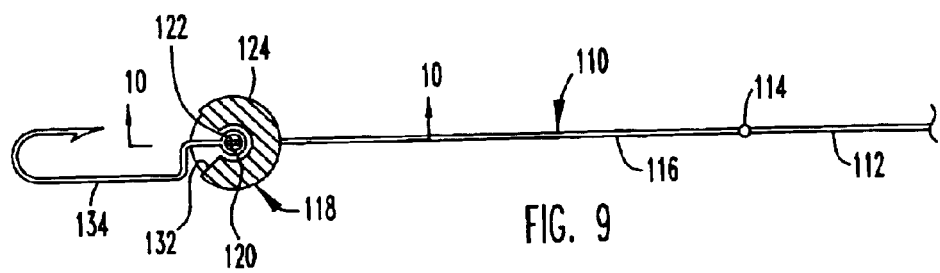
FIG. 9 is a sectional side view of a third embodiment fishing lure assembly in accordance with the present invention, the view taken generally along line 9—9 of FIG. 10.
Figure 10:
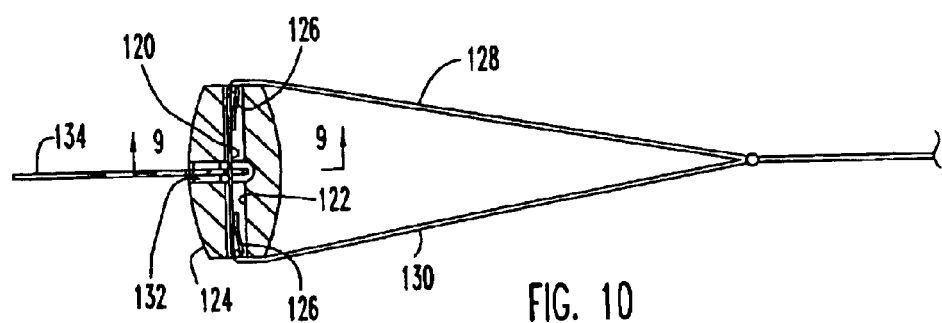
FIG. 10 is a sectional top view of the fishing lure assembly shown in FIG. 9, the view taken generally along line 10—10 of FIG. 9.

FIGS. 9 and 10 illustrate a third embodiment fishing lure assembly 110 attached to a fishing line 112 by a knot 114. The fishing lure assembly includes a snag guard 116 and a jig 118. The snag guard has a rigid attachment member 120 slideably received in a through bore 122 in the jig head 124. The bore 122 extends through the center of gravity of the jig head 124. The attachment member has a pair of opposed mounting hooks 126 adjacent the ends of the bore 122. Guard filaments 128, 130 formed from fishing line are tied to the hooks 126 and extend back to the knot 114.

The bore 122 extends through a central recess 132 open to the rear of the jig head 124 that receives the eyelet end of a fishhook 134. The attachment member extends through the eyelet and pivotally mounts the fishhook to the jig head. The attachment member can be slid out of the bore 134 and one of the guard filaments 128, 130 temporarily removed to enable a change of hooks.

In variant embodiments of the snag guard 116, the mounting hooks 126 can be separate members permanently cast in place or otherwise rigidly mounted to the jig head 124 for attaching the free ends of the guard filaments. In such embodiments the bore 122 can be eliminated.

Figure 11:
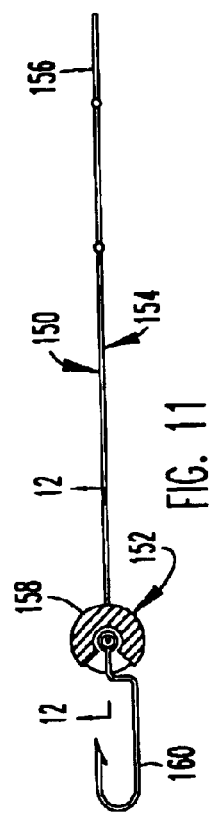
FIG. 11 is a sectional side view of a fourth embodiment fishing lure assembly in accordance with the present invention, the view taken generally along line 11—11 of FIG. 12.
Figure 12:
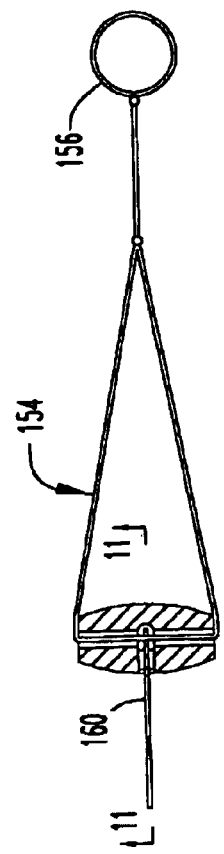
FIG. 12 is a sectional side view of the fishing lure assembly shown in FIG. 11, the view taken generally along line 12—12 of FIG. 11.

FIG. 11 illustrates a fourth embodiment fishing lure assembly 150 having a jig 152 and a snag guard 154 mounted to the jig. The snag guard is formed from flexible fishing line and extends to a looped end 156 for connecting the assembly 150 to a fishing line (not shown). The jig includes a jig head 158 similar to the jig head 124 for mounting the snag guard 154 and receiving the eyelet end of a fishhook 160. The snag guard 154 is similar to the snag guard 18 and is formed from a length of flexible fishing line. The attachment portion of the snag guard extends through the eyelet of the fishhook 160 to pivotally mount the fishhook to the jig head.

Figure 13:
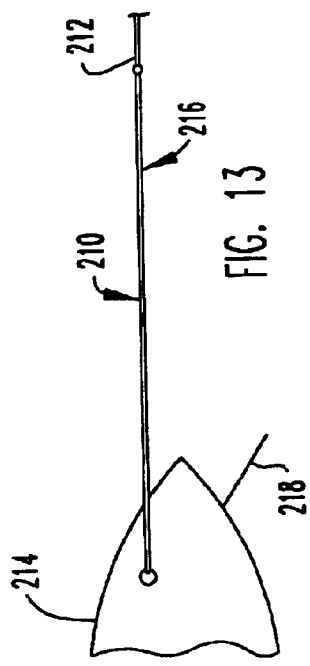
FIG. 13 is a partial side view of a fifth embodiment fishing lure assembly in accordance with the present invention.
Figure 14:
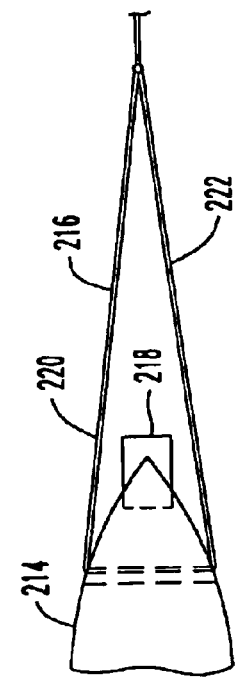
FIG. 14 is a partial side view of the fishing lure assembly shown in FIG. 13.

FIGS. 13 and 14 illustrate a fifth embodiment fishing lure assembly 210 attached to a fishing line 212. The fishing lure assembly 210 includes a crankbait 214 and a snag guard 216, like the snag guard 18, mounted to the crankbait. The crankbait is designed to vibrate during retrieve and includes a conventional bill 218 to provide stability to the crankbait as the crankbait is pulled through the water. The guard filaments 220, 222 can flex to enable the crankbait to vibrate and attract fish.

FIG. 14 illustrates that it is not necessary that the guard member of the snag guard extend from the widest portion of the lure body. As shown in the figure, the width of the crankbait continues to increase away from the snag guard. The width increases smoothly, however, and would not cause an obstacle to snag against the body after passing filaments 220 or 222.

Furthermore, the snag guard precedes the bill 218 during the retrieve. The bill 218 is located between the sides of the guard so that the guard diverts obstacles to either side of the bill. This enables the snag guard to protect the bill from obstacles although though the guard is not attached to nor contacts the bill itself.

Figure 15:
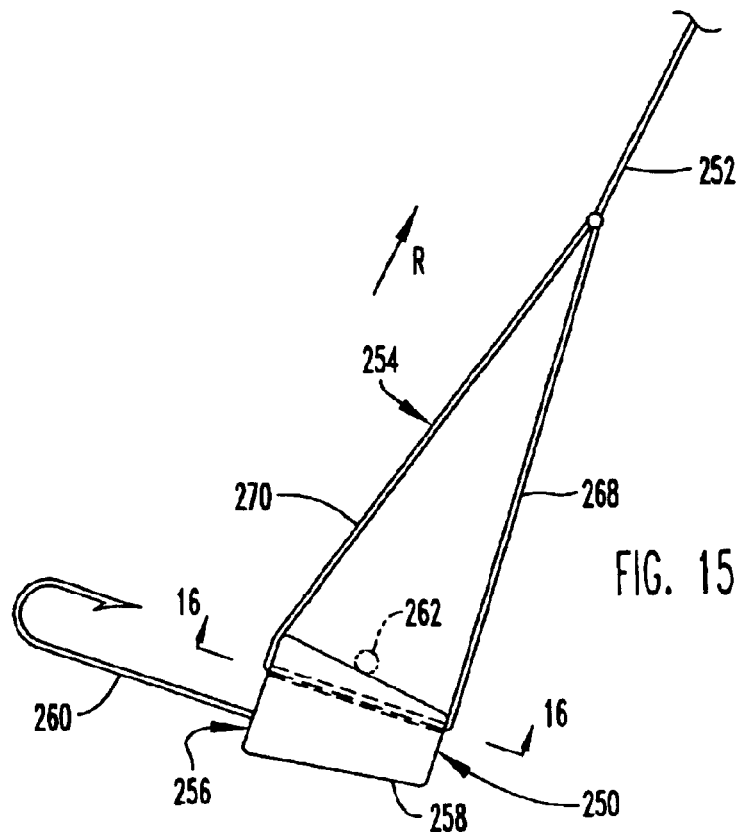
FIG. 15 is a side view of a sixth embodiment fishing lure assembly in accordance with the present invention.
Figure 16:
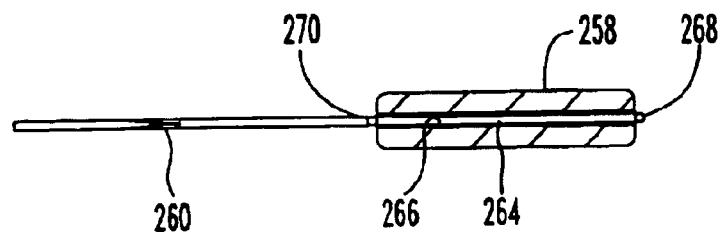
FIG. 16 is a sectional view of the fishing lure assembly shown in FIG. 15 taken along lines 16—16 of FIG. 15.

FIGS. 15 and 16 illustrate a sixth embodiment fishing lure assembly 250. Fishing line 252 pulls the assembly 250 in a retrieve direction R. The assembly includes a snag guard 254, similar to the snag guard 18, mounted to a jig 256. The jig 256 includes a generally plate-like jig head 258 and a fishhook 260. The jig is fished along bottom structure with the jig head 258 substantially vertical, and it is advantageous that the jig head 258 be oriented with respect to the retrieve as shown to facilitate "bumping" of the jig along the bottom.

The fishhook of a conventional jig similar to the jig 256 includes an eyelet 262 (shown in phantom in FIG. 15) positioned on the upper edge of the jig head. The eyelet position enables the jig head to assume the orientation of the jig shown in the figure.

The snag guard 254 is mounted to the jig head 258 such that the jig can assume the orientation of the conventional jig during retrieve. It includes an attachment member 264 carried in a through bore 266 in the jig head and guard filaments 268, 270 similar to the guard filaments 34, 36. The bore 266 is above jig head's center of gravity but unlike prior embodiments, the bore 266 is parallel with the length of the jig (that is, parallel with the shank of the fishhook 260). This enables the attachment member to maintain the jig in the orientation shown in FIG. 15. Note that if the bore 266 were perpendicular to the shank, that is, through the thickness of the plate, the jig would tend to pivot about the attachment member in the bore and would not maintain the desired orientation shown in FIG. 15.

If a foreign object contacts the filament 268 during retrieve, the snag-guard operates like the snag guard 18. If an object contacts the filament 270, the object would engage the dressing carried on the hook 260. The fishing line making up the snag guard 254 can slide in the bore 266, enabling the jig to rotate counterclockwise as shown in FIG. 15 and pass by the object. Preferably the hook 260 includes a hook guard or the hook and dressing combination is snag-resistant to enable the object to pass the jig without snagging the hook.

The guard members in the illustrated embodiments are formed from fishing line or other flexible material. In other possible embodiments of the present invention the guard member may be formed from a stiff, lightweight wire or equivalent material. It is also contemplated that in yet other possible embodiments of the present invention that a plurality of guard members, each guard member in a respective plane, be provided.

When adapting a conventional fishing lure to be used with the snag guard of the present invention, the orientation of the snag guard with respect to the fishing lure is determined by the lure construction and the conventional attachment point of the fishing line to the lure. The conventional attachment point is generally located between the ends of the guard member. The orientation of the plane of the guard member is determined by the intended line of pull of the fishing line through the lure so that the lure retains its intended action and orientation during retrieve.

While I illustrated and described preferred embodiments of my invention, it is understood that these are capable of modification, and I therefore do not wish to be limited to the precise details set forth, but desire to avail myself of such changes as fall within the purview of the following claims.

What I claim as my invention is:

1. A snag-resistant fishing lure assembly intended to be retrieved by a fishing line pulling the assembly through the water in a retrieval direction along a retrieval path, the lure assembly comprising:

a fishing lure, a snag guard to resist snagging of the lure by an obstacle during the retrieve, and a connection mounting the snag guard to the fishing lure;

the fishing lure comprising a body and at least one fishhooks attached to the body, the body comprising a front portion, a rear portion, a body cross section between the front and rear portions, and first and second outer surfaces on the body cross section located on generally opposite sides of the body and separated by a first width dimension, the front portion preceding the rear portion during retrieve, the front portion adjacent said body cross section diverging outwardly as it extends to said body cross section when viewed from above, wherein the body cross section is a relatively non-narrow cross section of the body;

the snag guard comprising means for attaching the lure assembly to an attachment point along the fishing line, the means for attaching and attachment point spaced ahead of the entire fishing lure in the retrieval direction during retrieve, the attaching means having a second width dimension transverse to the retrieval direction and configured to be engagable with an obstacle without substantial risk of snagging, the first width dimension substantially greater than the second width dimension;

the snag guard further comprising substantially straight, elongate first and second guard members extending from the attaching means away from each other and towards the lure body during retrieve, the first guard member extending from the attaching means to adjacent the first outer surface and the second guard member extending from the attaching means to adjacent the second outer surface wherein the body cross section is between the guard members, the guard members extending without abrupt changes in direction that could otherwise snag an obstruction; and each guard member comprising a forward portion extending from the attachment means and an end portion adjacent the body, the forward portion spaced ahead of the entire fishing lure during retrieve so that an obstacle encountered during retrieve engages the guard member ahead of the fishing lure, the end portion being adjacent the respective first outer surface and second outer surface and in substantially tangential alignment with the rear portion of the lure body during retrieve;

wherein an obstacle engaging the snag guard during retrieve slides smoothly along the first or second guard member and slides smoothly from such guard member to the rear portion of the lure body thereby reducing the risk of snagging.

2. The lure assembly of claim 1 wherein the connection mounting the snag guard to the body comprises a bore extending through the body.

3. The fishing lure assembly of claim 2 wherein the connection mounting the snag guard to the body comprises a bore extending through the body, the bore having open ends proximate the first and second outer surfaces, and an attachment member in the bore joining the guard members.

4. The fishing lure assembly of claim 3 wherein the guard members and the attachment member are formed from a continuous length of flexible material.

5. The fishing lure assembly of claim 1 wherein the snag guard is formed from and continuous with the fishing line retrieving the lure assembly.

6. The fishing lure assembly of claim 1 wherein the guard members are flexible members that are urged taut by the fishing line during the retrieve.

7. The fishing lure assembly of claim 1 wherein the connection mounting the snag guard to the body pivotally mounts the guard members to the body.

8. The fishing lure assembly of claim 7 wherein the connection defines a pivot axis and the lure has a center of gravity, the guard members pivotable about the axis and the lure center of gravity spaced from the pivot axis.

9. A snag-resistant jig assembly intended to be retrieved by a fishing line in a retrieval direction, the jig assembly comprising:

a jig head, a snag guard to resist snagging of the jig head by an obstacle during retrieve, and a connection mounting the snag guard to the jig head;

the jig head comprising a non-buoyant jig head and a fishhook attached to the jig head, the jig head being a metal, one-piece, generally nonplanar member, the fishhook comprising a shank portion and a hook portion, the jig head at least partially surrounding the shank portion;

the jig head having front and rear portions, the front portion of the jig head consisting of the jig head and the shank portion of the fishhook;

the jig head comprising spaced-apart first and second outer surfaces, the surfaces defining a relatively wide cross section of the jig head transverse to the retrieval direction, the surfaces on substantially opposite sides of the jig head;

the snag guard comprising means for attaching the jig assembly to a fishing line, the attaching means spaced ahead of the jig head in the retrieval direction during retrieve; and the snag guard further comprising substantially straight first and second guard filaments extending from the attaching means ahead of the jig head during retrieve so that an obstacle encountered during retrieve engages the guard filaments ahead of the jig head, the guard filaments extending from the attaching means ahead of the jig head and extending towards the jig head during retrieve, the first guard filament extending from the attaching means to adjacent the first surface and the second guard filament extending from the attaching means to adjacent the second surface wherein the jig head cross section is between the guard filaments, the guard filaments extending away from each other as the guard members extend from the attaching means toward the jig head;

wherein an obstacle engaging the snag guard during retrieve slides along the first or second guard filament and is directed to the outer surfaces of the jig head, thereby reducing the risk of snagging the jig head against the obstacle.

10. The jig assembly of claim 9 wherein the fishhook extends away from the jig head in a direction transverse to the retrieval direction.

11. The jig assembly of claim 9 wherein the snag guard is formed from and continuous with the fishing line that retrieves the lure.

12. The jig assembly of claim 9 wherein the snag guard consists of flexible monofilament.

13. The jig assembly of claim 9 wherein the connection mounting the snag guard to the jig head comprises a bore extending through the jig head and an attachment member in the bore joining the guard filaments.

14. The jig assembly of claim 13 wherein the snag guard and the attachment member consist of monofilament.

15. The jig assembly of claim 9 wherein the connection pivotally mounts the snag guard to the jig head for rotation about a pivot axis, the pivot axis spaced from the center of gravity of the jig head.

16. The jig assembly of claim 9 wherein the fishhook is fixedly mounted to the jig head.

17. The jig assembly of claim 9 wherein the fishhook is pivotally attached to the jig head for at least limited rotation about a pivot axis.

* * * * *